Dec. 2, 1924.

R. M. LOVEJOY 1,517,789

BRAKE MECHANISM FOR VEHICLES

Filed June 9, 1921   5 Sheets-Sheet 1

Inventor.
Ralph M. Lovejoy
by Heard Smith & Tennant.
Attys

Dec. 2, 1924.                                                    1,517,789
R. M. LOVEJOY
BRAKE MECHANISM FOR VEHICLES
Filed June 8, 1921          5 Sheets-Sheet 5

Inventor.
Ralph M. Lovejoy
by Heard Smith & Tennant.
Attys

Patented Dec. 2, 1924.

1,517,789

UNITED STATES PATENT OFFICE.

RALPH M. LOVEJOY, OF MEREDITH, NEW HAMPSHIRE.

BRAKE MECHANISM FOR VEHICLES.

Application filed June 8, 1921. Serial No. 475,912.

*To all whom it may concern:*

Be it known that I, RALPH M. LOVEJOY, a citizen of the United States, and resident of Meredith, county of Belknap, State of New Hampshire, have invented an Improvement in Brake Mechanisms for Vehicles, of which the following description, in connection with the accompanying drawing, is a specification, like characters on the drawing representing like parts.

This invention relates to improvements in braking mechanisms for vehicles and the principal object of the invention is to provide means for applying brakes which will exert an equal braking power upon the brakes of certain pairs, or preferably all of the wheels of the vehicle.

A further object of the invention is to provide braking mechanism for the steering wheels of a vehicle in which equal braking power may be applied to both steering wheels irrespective of the steering position of said wheels.

A further object of the invention is to provide means for applying equal braking force to each of the steering wheels and also to apply an equal braking force to the other supporting wheels.

A further object of the invention is to provide differentially operated mechanism including frictional means for applying equal braking force to the steering wheels and also differentially operable mechanism including frictional means for supplying equal braking force to the members of other pairs of supporting wheels with differentially operable means, preferably under frictional control, for causing equal application of braking force to the steering wheels and the other supporting wheels of the vehicle.

A further object of the invention is to provide means for positively and simultaneously releasing both brakes of a pair of wheels and preferably for positively, simultaneously releasing the brakes for all the wheels of the vehicle.

Other objects and features of the invention will more fully appear from the following description and the annexed drawings and will be pointed out in the accompanying claims.

The invention is illustrated herein as applied to a motor driven vehicle or automobile of the usual type only so much of the chassis of the vehicle being shown as is required to illustrate the application of the invention thereto.

Figure 1:
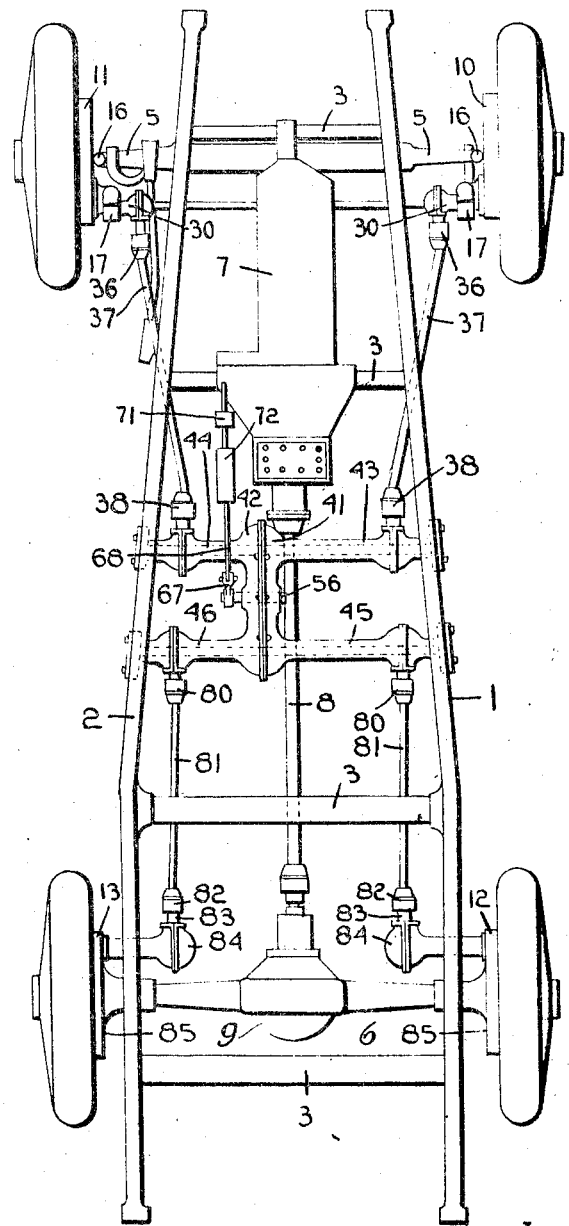
Fig. 1 is a plan view of the chassis of a vehicle illustrating the improved braking mechanism as applied to the steering and driving wheels.
Figure 2:
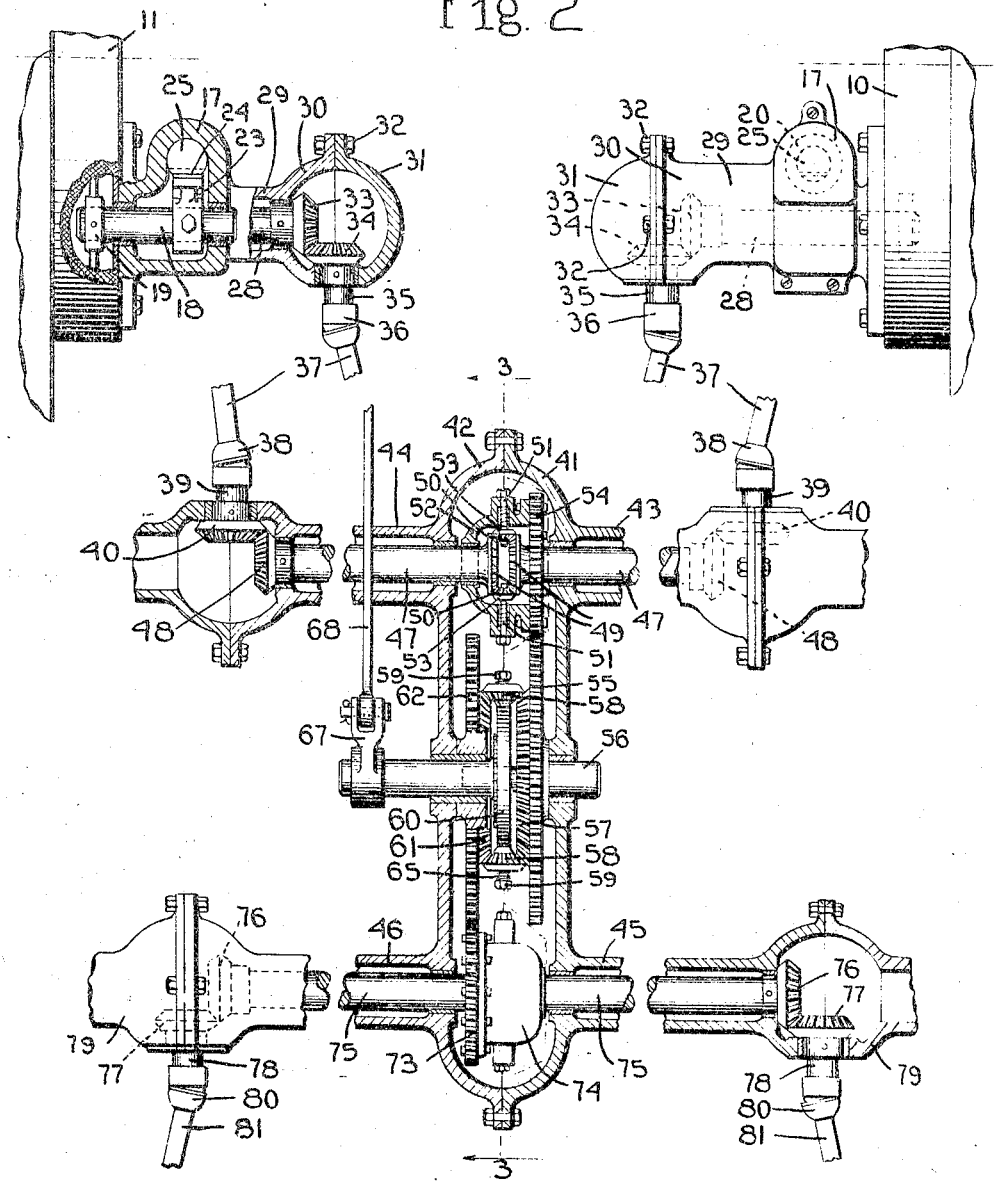
Fig. 2 is a plan view, on an enlarged scale, certain portions of the mechanism being broken away, and other portions shown in section, to illustrate the brake applying equalizing and actuating mechanisms.

The invention in its broad aspect comprises braking machanism for vehicles in which the brakes for the steering wheels are actuated through equalizing means which will cause the brakes to operate with equal braking power upon each of the steering wheels. In the preferred embodiment of the invention the equalizing means comprises a pair of equalizer shafts which are actuated through a differential having a frictionally controlled differential pinion. Preferably the other pair or pairs of wheels of the vehicle are also provided with brakes and each pair is controlled by differentially operable means. Differential actuating means are provided for actuating the differentials which control all the equalizer means so that equal braking power will be applied to each of the wheels of the vehicle.

Usual motor vehicle constructions comprise two pairs of wheels, a pair of rear driving wheels and a pair of front steering wheels. In the present embodiment of the invention, therefore, means are illustrated for equalizing the braking mechanism for the steering wheels and also the driving wheels. It will, however, be understood that if a greater number of pairs of wheels are employed a duplication of the equalizing mechanism may be provided for so many pairs as may be desired within the spirit and scope of the invention. Furthermore, it will be understood that if instead of a pair of steering wheels, a single front steering wheel is provided, suitable equalizing means embodying the principles of the invention herein set forth may be incorporated to provide an equal braking action upon the steering wheel and the other wheels of the vehicle.

The chassis of the motor vehicle which is illustrated herein comprises the usual side frames 1, 2, which are connected by cross girders 3, the frame being supported by suitable springs 4 upon the usual front and rear axles 5, 6. The vehicle may be driven by any type of motor, such as an internal combustion engine 7, which operates through a driving shaft 8 and the usual type of differential contained in a casing 9 forming part of the rear axle to drive the rear wheels of the vehicle. It will be understood, however, that the present invention may be applied to a vehicle in which all of the wheels are power driven.

As illustrated herein the front wheels are respectively provided with brake drums 10, 11, and the rear wheels with brake drums 12, 13, said brake drums being preferably enclosed in casings of the usual type.

Any suitable form of expanding or contracting brake mechanism may be employed. Preferably, however, the brakes are of the type illustrated and described in Patent No. 1,363,607, granted December 28, 1920, which discloses braking mechanism in which means are provided for expanding a pair of diametrically oppositely disposed brake shoes against the drum with equal braking force and also illustrates mechanism for insuring simultaneous release of all parts of the brake shoes from engagement with the drum. In that construction the means for applying and releasing the brakes comprises a rock shaft which is connected by suitable links and levers to the brakes so that the oscillatory movement of the brake applying shaft causes the simultaneous application or release of the brakes. In the present embodiment of the invention a similar brake applying rock shaft desirably is provided. In view of the fact that other well known types of brakes are applied through a brake applying rock shaft the application of the present invention to other types of brakes will be readily understood without the necessity of detail illustration of other types of brakes.

The most difficult problem in providing means for braking the steering wheels of a vehicle arises from the fact that the steering wheels must be moved about a pivotal axis to various steering positions.

In the present invention disks 14 are secured rigidly to the front axle spindles 15 which are pivotally mounted in the usual steering knuckles 16 at the ends of the axle 5. To each of the disks 14 a housing 17 is secured, by bolts or other suitable fastening, which is provided with journals for a brake applying rock shaft 18 having an arm 19 through which the brake shoes are forced toward and away from the brake drum. The housing 17 is provided with a tubular downward extension 20 upon which a lower box-like housing or casing 21 is rotatably mounted. The lower end of the tubular extension 20 is provided with a screw threaded supporting member 22 which underlies, engages and supports the housing 21. The housings 17 and 21 are formed in sections as illustrated in order that they may be easily assembled.

The rock shaft 18 is provided with a gear segment 23 which engages teeth 24 in the flattened side of a cylindrical rack bar 25 which is slidably journalled in a suitable bearing concentric with the tubular extension 20. The lower end of the rack bar 25 is provided with a series of annular teeth 26 which are engaged by a gear segment 27 carried by a horizontal transmitter shaft 28 which is journalled in suitable bearings in an extension 29 of the lower housing 21. The outer end of the housing 29 is provided with an enlarged, preferably hemispherical, flanged extension 30 and is covered by a suitable hemispherical cap 31 having flanges corresponding to those of said extension and adapted to be secured thereto by suitable bolts 32. The shaft 28 is provided at its outer end with a beveled gear 33 which engages a complementary beveled gear 34 carried by a short shaft 35 journalled in a bearing in the extension 30 and cap 31. The shaft 35 is connected by a universal or gimbal joint 36 to a longitudinally extending transmitter shaft 37, the opposite end of which is connected by a gimbal joint 38 to a short shaft 39 which is mounted in an equalizer frame and is provided with a beveled gear 40 which is operated by one of the equalizer shafts.

The equalizer frame comprises a central body portion formed in two sections 41 and 42 having suitable flanges by means of which the same may be secured together, said sections being provided with laterally extending tubular arms 43 and 44 which are secured at their ends to the side bars 1 and 2 of the frame. The body portion of the equalizer frame desirably extends lengthwise of the central portion of the chassis and has at its rear end similar tubular extensions 45 and 46 which also are anchored at their ends to the side bars 1 and 2 of the frame. Thus the equalizer frame is rigidly supported and its hollow body also provides an oil chamber.

A pair of collinear equalizer shafts 47 are mounted in suitable bearings in the tubular extensions 43 and 44 of the equalizer frames and at their outer ends are provided with gears 48 which engage the gears 40 of the longitudinal transmitter shafts. The collinear equalizer shafts are provided at their inner or adjacent ends with differential gears 49 which are engaged and driven by differential pinions 50 which are mounted upon preferably diametrically oppositely arranged stud shafts 51 in a two-part casing 52 which is provided with bearings rotatably mounted upon the equalizer shafts 47. Friction disks 53, which are secured against rotation upon the stud shafts 51, are pressed against the outer faces of the differential pinions 50 by helical springs surrounding said stud shafts 51 and serve to prevent the pinions from rotation about their axes until sufficient rotative force is applied to overcome the friction between the disks 53 and the outer faces of the differential pinions.

Any suitable means may be provided for rotating the differential casing 52 to actuate the differential shafts 47. As illustrated herein one side of the casing comprises a gear 54 which may be rotated by the brake lever in any suitable manner. As illustrated herein the gear 54 is actuated through another or master differential which also controls the rotation of equalizer shafts for the brakes of the rear wheels.

In the present illustrative embodiment of the invention the gear 54 engages and is driven by a gear 55 which is rotatably mounted upon a shaft 56 of a master differential. A beveled gear 57 which is also rotatable upon the shaft 56 desirably is rigidly secured to the gear 55 and is actuated through differential pinions 58 which are mounted upon stud shafts 59 carried by a disk 60 which is rigidly secured to the master differential shaft 56.

The differential pinions 58 also engage a beveled gear 61 which is rigidly secured to the face of a gear 62 which is also rotatably mounted about the axis of the shaft 56. The gear 62 in turn engages a suitable gear for actuating the differential which in turn controls the rotation of collinear equalizer shafts for the rear wheel brakes as will hereinafter be more fully described.

The stud shaft 59 preferably is anchored in the disk 60 by a screw threaded connection 63 and the inner faces of the differential pinions 58 frictionally engage surfaces 64 upon the outer face of the disk 60. The differential pinions 58 are forced against the frictional surfaces 64 by springs 65 interposed between the outer faces or hubs of the differential pinions 58 and the heads 66 of the stud shafts 59, so that the rotation of the pinion 58 will be prevented unless greater resistance is imposed to the rotation of one of the gears 57 or 61 than to the other.

The shaft 56 of the master differential is provided with an arm 67 which is connected by a link 68 to a manually operable lever 69 which is pivotally mounted upon a shaft 70 extending transversely of the frame. The lever 69 desirably is provided with a pedal 71.

Figure 3:
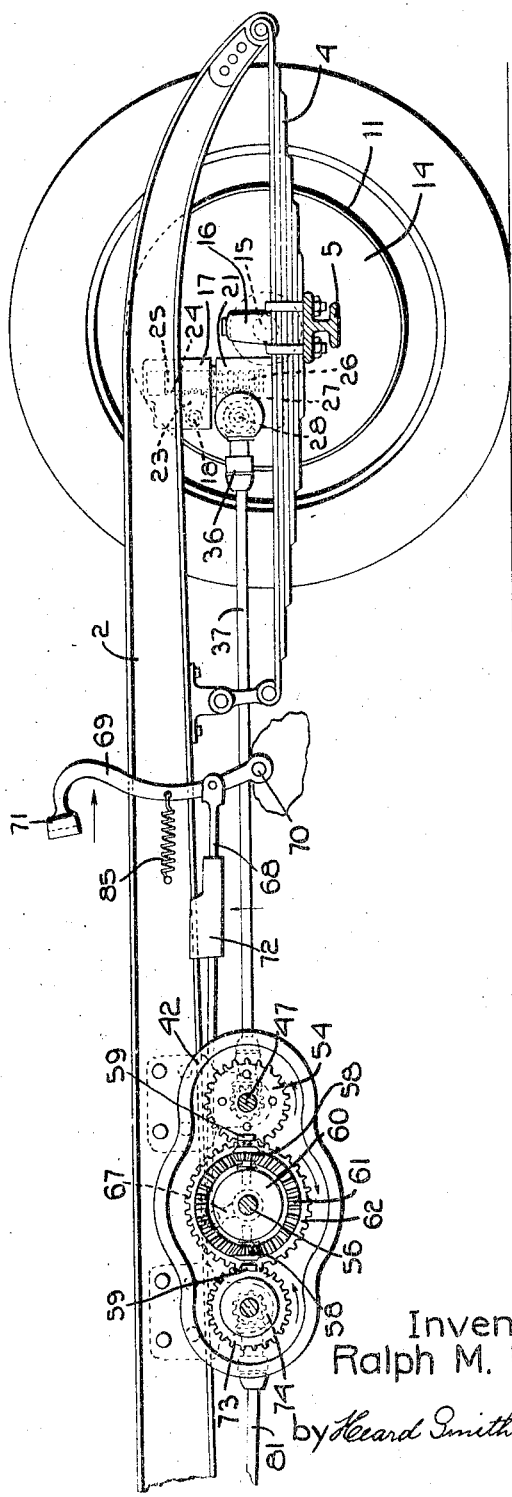
Fig. 3 is an elevation, partly in section, of one of the wheel supported side frames of a motor vehicle, showing one section of the supporting frame for the equalizing mechanism removed and illustrating the shafts of the equalizing mechanism and the front axle in section.
Figure 4:
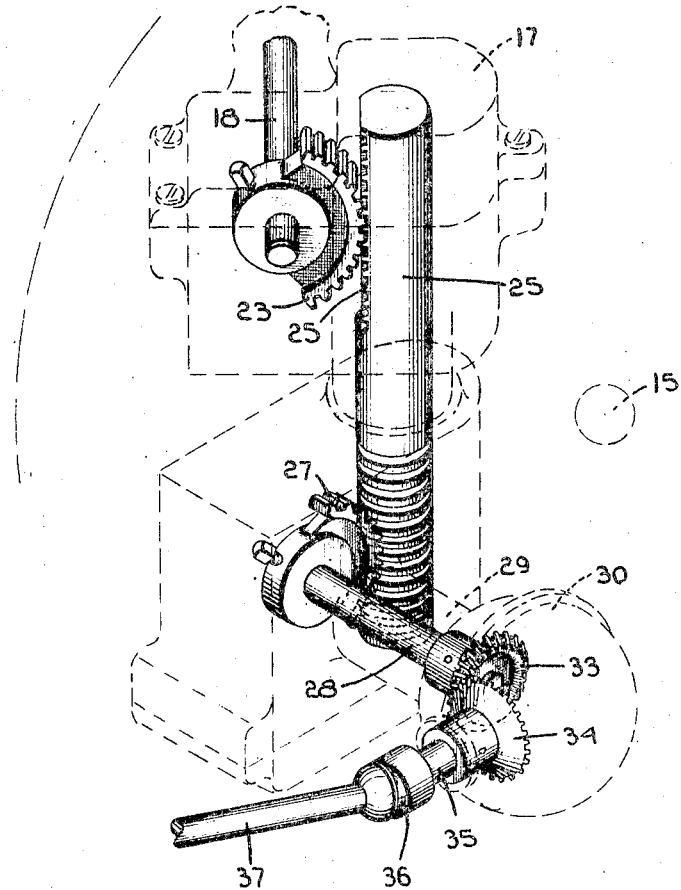
Fig. 4 is an enlarged detail perspective view showing the means for transmitting power through a brake knuckle, the members of the brake knuckle being shown in dotted lines in a position in which the steering wheels are turned to one side.
Figure 5:
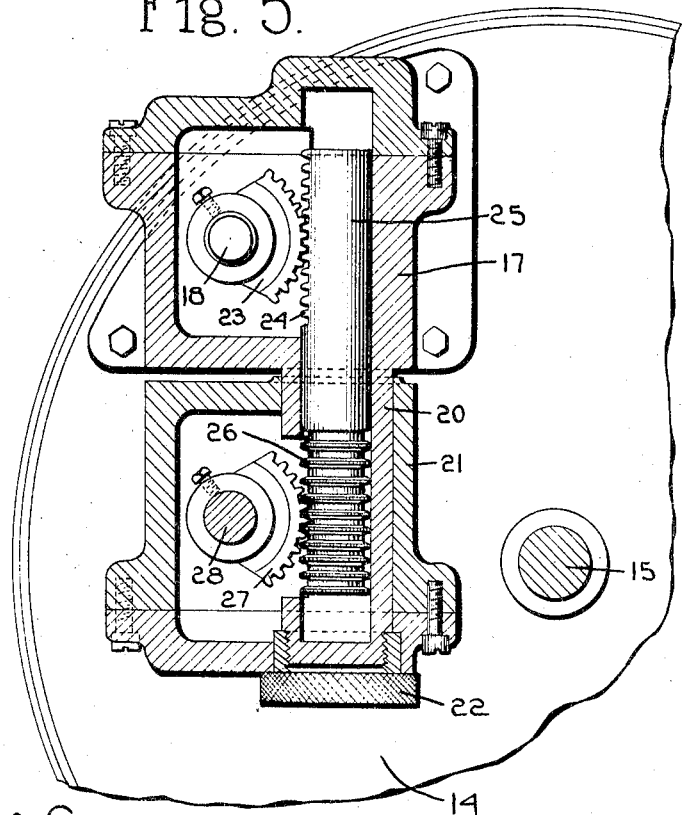
Fig. 5 is a detail view in vertical section of one of the brake knuckles, showing the means for transmitting the power therethrough to the braking mechanism.
Figure 6:
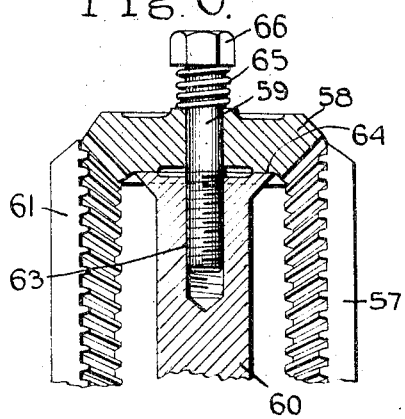
Fig. 6 is a detail view, partly in section, showing the differential gears and one of the frictionally controlled differential pinions which actuate said gears.

Preferably means are provided for automatically taking up any wear which may occur in the train of the braking mechanism. A preferred construction which is diagrammatically illustrated as a casing 72 in Fig. 3 in the present application is fully disclosed in my pending application No. 443,000 filed February 7, 1921. In that construction the link which connects the brake lever 69 to the brake actuating mechanisms is formed in sections and a supplemental lever is provided which is operable automatically, when the brake lever is advanced beyond a predetermined distance, to increase the braking action and also to shorten the effective length of the connecting linkage 68.

As before stated, the equalizing means may be provided to apply power equally upon the brakes for the rear wheels, or such other supporting wheels as may be provided.

In the construction illustrated herein the gear 62 engages a gear 73 which is secured to a differential casing 74 which is rotatably mounted upon collinear equalizer shafts 75 extending axially through the extensions 45 and 46 of the equalizer frame. Differential gearing, preferably identical with that contained in the equalizer casing 52 above described, is provided for actuating the rear collinear differential equalizer shafts 75.

The shafts 75 are provided at their ends with beveled gears 76 which engage beveled gears 77 carried by short shafts 78 which are mounted in suitable bearings in enlarged portions 79 of the laterally extending members 45 and 46 of the equalizer frame. The shafts 78 are connected by universal or gimbal joints 80 to longitudinally rearwardly extending transmitter shafts 81 which are connected at their rear ends by universal joints 82 to short shafts 83 which are journalled in a casing or hollow bracket 84 which is mounted upon a disk 85 which is rigidly secured to the rear axle.

The casing or bracket 84 contains a transverse brake actuating shaft provided at one end with a beveled gear which is driven by a beveled gear upon the shaft 83 and at its opposite end is provided with an arm which actuates the brake shoes in a manner similar to that above described in reference to the front wheel steering mechanism.

Preferably a slip joint is provided in the universal connection 82 to permit relative longitudinal movement of the casing 84 and longitudinal transmitter shaft 81 in order to compensate for the movement of the parts during the vertical reciprocation due to the yielding of the rear vehicle springs when the rear wheels pass over obstructions or depressions in the road.

In the operation of the device the application of braking force to the pedal 71 of the brake lever 70 causes the shaft 56 of the master differential to be rotated in a forward direction. This rotation of the shaft causes the rotation of the disk 60 and the differential pinions about the axis of the shaft 56. The differential pinions 58 which are normally held by friction from rotation in turn rotate the beveled gears 57 and 61 simultaneously and consequently rotate the larger gears 55 and 62 equally, unless greater resistance is encountered by one of these gears than the other, in which event the differential pinions will rotate sufficiently about their axes to cause equal braking power to be applied to both of the gears 55 and 62. The gear 62 which engages the gear 73 upon the rear differential casing rotates the latter and through the differential mechanism contained therein transmits equal rotative brake applying power to the collinear equalizer shafts 75 which in turn transmits power through the rearwardly extending transmitter shafts 81 to the shafts which apply the brakes to the rear axle.

At the same time the power which is applied through the gear 55 is transmitted through the gear 54 and rotates the forward differential casing 52 about the axes of the collinear equalizer shafts 47 and through the differential pinions 53, which, like the pinions 58, are normally held by friction from rotation, transmits an equal amount of power to each of the equalizer shafts 47. If greater resistance is encountered by one of the equalizer shafts than the other, the differential pinions rotate about their axes under the aforesaid frictional control so that one of these shafts is rotated until the power applied through it is equal to that applied through the other. The power applied through the equalizer shafts is transmitted through the forwardly extending transmitter shafts 37 to the transverse shafts 28 causing the rotation of the latter which operate the sectors 27. Each sector engages the annular teeth of the vertically extending rack bar 25 and reciprocates the same vertically in the line of the axis of the tubular member 20 which pivotally connects the casings 21 and 17. The toothed upper end 24 of the rack bar 25 thereupon rotates the sector 23 and the brake applying shaft 18 to which it is affixed, thereby oscillating the arm 19 upon the opposite end of said brake applying shaft 18 and applying the brakes to the forward brake drums.

It will be noted that by reason of the fact that the rack bar 25 reciprocates in the vertical axis of the pivotal connection between the lower casing 21 and the upper casing 17 the power applying shaft 18 may be applied when the steering wheels are in any steering position.

Furthermore, it will be observed that since the lower casing 21 is supported by the upper casing 17 through the tubular extension 20, the lower casing 21 is free to move both pivotally and laterally, so that with the universal connection 36 which connects the forwardly extending transmitter shaft 37 with the shaft 35 a free movement is permitted which will enable the steering wheels to be moved about the vertical axes of the steering posts without interfering in any manner with the actuation of the braking mechanism.

Any usual means may be provided for withdrawing the brake lever 69 when pressure upon the pedal 71 is released. As illustrated herein a spring 85 is connected to the brake lever 69 and to a shaft extending transversely between the side bars 21 and 22. Consequently, as soon as the brake is released the spring draws the brake lever rearwardly and causes the actuation of the differential mechanisms and equalizer shafts in the opposite direction. By reason of the friction control of the pinions 53 and 58 the equalizing mechanism is equally effective in its equalizing action upon backward movement and acts positively to release simultaneously all of the brake shoes from engagement with their respective brake drums.

While braking means have been illustrated herein for applying the brakes simultaneously and equally to all four wheels of a vehicle, it will be understood that the vehicle may be provided with but a single pair of brakes and that the braking mechanism may be applied either to the steering wheels or to the driving wheels or that independent means may be provided for actuating the brakes for the steering wheels from that which is utilized for operating the brakes of the driving wheels.

It will also be understood that if a greater number of pairs of wheels is provided suitable multiplication of collinear equalizer shafts and differential means of the character described for operating each of the shafts and for co-ordinating the operation of all of the equalizers may be provided within the spirit and scope of the invention.

It is further to be understood that the particular embodiment of the invention disclosed herein is of an illustrative character and is not restrictive and that any mechanism for accomplishing the purposes disclosed herein may be employed within the meaning and scope of the following claims.

Having thus described my invention, what I claim as new, and desire to secure by Letters Patent, is:

1. A vehicle having a plurality of wheels including a pair of steering wheels, a brake for each of said steering wheels, means for simultaneously actuating said brakes including equalizing means operating to cause equal application of said brakes and also acting positively to release said brakes completely and substantially simultaneously.

2. A vehicle having a plurality of wheels including a pair of steering wheels each of which is movable about a vertical pivotal axis, a brake for each of said steering wheels, means for simultaneously actuating said brakes including equalizing means operating to cause equal application of said brakes and also acting positively to release said brakes completely and substantially simultaneously.

3. A vehicle having a plurality of wheels including a pair of steering wheels each of which is provided with a brake drum, a non-rotatable brake in co-operative relation to each brake drum, means for simultaneously actuating said brakes including equalizing means operating to cause equal application of said brakes to said drums and also acting positively to cause complete and substantial simultaneous release of said brakes from said drums.

4. A vehicle having a pair of steering wheels each of which is pivotally mounted to swing about an independent vertical axis, a pair of brakes for each of said steering wheels, a pair of rotatable equalizer shafts, means operable respectively by said shafts to apply said brakes and differentially operable means acting upon said equalizer shafts to apply said brakes with equal force and also acting positively to release said pairs of brakes completely and substantially simultaneously.

5. A vehicle having a plurality of pairs of wheels, a brake for each wheel, a plurality of rotatable equalizer shafts each operable to apply brakes to the respective wheels, differentially operable means for actuating said equalizer shafts and means for equalizing the action of said equalizer means.

6. A vehicle comprising a frame, a pair of steering wheels each of which is pivotally mounted to swing about an independent vertical axis, a brake for each steering wheel and brake actuating means including power transmitting members pivotally movable respectively about axes parallel with the vertical axes of said steering wheels.

7. A vehicle comprising a frame, a pair of steering wheels each of which is pivotally mounted to swing about an independent vertical axis, a brake for each steering wheel, brake actuating means including power transmitting members pivotally movable respectively about axes parallel with the vertical axes of said steering wheels and reciprocable means movable in the direction of the lines of the pivotal axes of said power transmitting members.

8. A vehicle having a plurality of pairs of wheels including steering wheels each of which is provided with a brake drum, non-rotatable disks carrying brakes co-operating with the respective brake drums, a brake knuckle carried by each disk comprising a casing fixedly secured to said disk and a casing pivotally mounted upon said fixed casing, brake applying shafts mounted in said fixed casings, power transmitting means mounted in said pivotally mounted casing, means for simultaneously actuating said transmitting means and means for operating said brake applying shaft from said transmitting means.

9. A vehicle having a plurality of pairs of wheels including steering wheels each of which is provided with a brake drum, non-rotatable disks carrying brakes cooperating with the respective brake drums, a brake knuckle carried by each disk comprising a casing fixedly secured to said disk and a casing pivotally mounted upon said fixed casing, brake applying shafts mounted in said fixed casings, power transmitting shafts mounted in said pivotally mounted casing, means for simultaneously actuating said transmitting shafts, and members reciprocable in the direction of the axes of the pivotal connections of said casings acting to transmit rotation from said transmitting shafts to said brake applying shafts.

10. A vehicle having a plurality of pairs of wheels including steering wheels each of which is provided with a brake drum, non-rotatable disks carrying brakes co-operating with the respective brake drums, a brake knuckle carried by each disk comprising a casing fixedly secured to said disk and a casing pivotally mounted upon said fixed casing, brake applying shafts mounted in said fixed casings, power transmitting shafts mounted in said pivotally mounted casing, means for simultaneously actuating said transmitting shafts, gears on said brake applying shafts and on said transmitting shafts and racks reciprocable in the direction of the axes of the pivotal connections of said casings acting to transmit rotation from said transmitting shafts to said brake applying shafts.

11. A vehicle having a plurality of pairs of wheels including steering wheels each of which is provided with a brake drum, non-rotatable disks carrying brakes co-operating with the respective brake drums, a brake knuckle carried by each disk comprising a casing fixedly secured to said disk and a casing pivotally mounted upon said fixed casing, brake applying shafts mounted in said fixed casings, power transmitting shafts mounted in said pivotally mounted casing, means for simultaneously actuating said transmitting shafts, gears on said brake applying shafts and on said transmitting shafts, racks reciprocable in the direction of the axes of the pivotal connections of said casings having plain teeth engaging the gears of said brake applying shafts and annular teeth engaging the gears of said transmitting shafts acting to transmit motion from said transmitting shafts to said brake applying shafts.

12. A vehicle having a plurality of pairs of wheels including steering wheels, a brake for each steering wheel, brake applying means including collinear equalizer shafts having differential gears upon their adjacent ends, differential pinions engaging said differential gears, means for imparting a planetary movement to said differential pinions about the axes of said equalizer shafts and means governing the rotation of said differential pinions operating to cause equal aplication of said brakes and acting simultaneously to release said brakes.

13. A vehicle having a plurality of pairs of wheels including steering wheels, a brake for each steering wheel, brake applying means including collinear equalizer shafts having differential gears upon their adjacent ends, a differential casing rotatable about the axes of said equalizer shafts and means for actuating the same, differential pinions engaging said differential gears mounted upon shafts in said differential casings and spring actuated frictional means governing the rotation of said differential pinions.

14. A vehicle having a plurality of pairs of wheels including a pair of steering wheels, a brake drum carried by each of said steering wheels, non-rotatable brakes co-operating with said drums, brake applying shafts and means for actuating the same including collinear equalizer shafts and means for transmitting power from said equalizer shafts to said brake applying shafts including trains of gears for said equalizer shafts and said brake applying shafts and longitudinal transmitting shafts having universal connections to said trains of gears.

15. A vehicle having a plurality of pairs of wheels, a brake and brake applying means for each wheel, pairs of equalizer shafts, means operable by each pair of equalizer shafts to actuate the brake applying means for a pair of wheels, a differential connecting each pair of equalizer shafts and means for simultaneously actuating said differentials selectively to cause the application or release of said brakes.

16. A vehicle having a plurality of pairs of wheels, a brake and brake applying means for each wheel, pairs of equalizer shafts, means operable by each pair of equalizer shafts to actuate the brake applying means for a pair of wheels, a differential connecting each pair of equalizer shafts, a master differential actuating all said equalizer differentials and means for operating said master differential.

17. A vehicle having a plurality of pairs of wheels, a brake and brake applying means for each wheel, pairs of equalizer shafts, means operable by each pair of equalizer shafts to actuate the brake applying means for a pair of wheels, a differential connecting each pair of equalizer shafts, a master differential for actuating all of said equalizer differentials comprising differential gears and a disk carrying differential pinions meshing with said master differential gears, frictional means governing the rotation of said pinions and means for rotating said disk.

18. A vehicle having a plurality of pairs of wheels, a brake and brake applying means for each wheel, pairs of equalizer shafts, means operable by each pair of equalizer shafts to actuate the brake applying means for a pair of wheels, a differential connecting each pair of equalizer shafts, a master differential actuating all said equalizer differentials comprising differential gears engaging gears of the equalizer differentials, a disk having on its periphery stud shafts carrying differential pinions engaging the master differential gears and springs mounted on said stud shafts acting to force said differential pinions into frictional engagement with said disks thereby to govern the rotation of said master differential pinions and means for actuating said disk.

19. A vehicle having a frame, a plurality of pairs of wheels, brakes and brake applying means for each wheel, an equalizer frame comprising a body portion forming an oil chamber and tubular extensions anchored at their ends to the frame of the vehicle, pairs of collinear equalizer shafts mounted in said tubular extensions, means operable by each pair of equalizer shafts to actuate the brake applying means for a pair of wheels, a differential connecting each pair of equalizer shafts, a master differential for operating said equalizer differentials and means for actuating said master differential.

In testimony whereof, I have signed my name to this specification.

RALPH M. LOVEJOY.